United States Patent [19]

Sumi

[11] Patent Number: 4,862,064
[45] Date of Patent: Aug. 29, 1989

[54] END SENSOR

[75] Inventor: Sigeo Sumi, Saitama, Japan

[73] Assignee: Somar Corporation, Tokyo, Japan

[21] Appl. No.: 179,813

[22] Filed: Apr. 11, 1988

[30] Foreign Application Priority Data

Apr. 10, 1987 [JP] Japan .................................. 62-88064

[51] Int. Cl.⁴ .......................................... G01R 27/02
[52] U.S. Cl. .................................. 324/65 P; 271/258;
156/344; 156/584; 156/64; 156/378
[58] Field of Search ............... 324/61 P, 65 P; 73/1 J;
156/344, 584, 64, 378; 33/556, 558, 559, 561;
29/846; 271/261, 263, 259; 198/464.2

[56] References Cited

U.S. PATENT DOCUMENTS 2,499,125  2/1950  Backhouse .......................... 271/258
2,579,406 12/1951  Tebbs ................................ 271/258
4,724,032  2/1988  Kay .................................... 271/97

Primary Examiner—Reinhard J. Eisenzopf
Assistant Examiner—Anthony L. Miele
Attorney, Agent, or Firm—Sughrue, Mion, Zinn, Macpeak & Seas

[57] ABSTRACT

An end sensor for detecting the end of a thin film stuck to a base plate such as may be used in a printed circuit board manufacturing apparatus. The sensor includes an electoconductive contact member, preferably shaped as a rod or plate, having a tip oriented in a direction at an acute angle to a direction of conveyance of said base plate so as to contact a surface of said base plate and a surface of the thin film. The sensor may be either of the electrostatic capacity type or of the electrical resistance type.

11 Claims, 3 Drawing Sheets

END SENSOR

BACKGROUND OF THE INVENTION

The present invention relates to a sensor. More particularly, the invention relates to an end sensor for detecting the end of a thin film stuck to a base plate.

A printed circuit board, which is used in electronic equipment such as a computer, includes an electrically insulating base plate and a wiring pattern made of copper or the like formed on one or both sides of the base plate.

The printed circuit board is manufactured with a process as follows: A stacked assembly of a photosensitive resin (photoresist) layer and a light-transmissible resin film (protective film) for protecting the photosensitive resin layer is laminated by heat and pressure on an electroconductive layer formed on the electrically insulating base plate. A wiring pattern film is then overlaid on the stacked assembly. The photosensitive resin layer is exposed to light through the wiring pattern film and the light-transmissible resin film for a prescribed time period. The light-transmissible resin film is then peeled off. Afterwards, the exposed photosensitive resin layer is developed to form an etching mask pattern. The unnecessary portion of the electroconductive layer is then removed by etching. The remaining photosensitive resin layer is thereafter removed to complete the printed circuit board having the prescribed wiring pattern.

In the manufacturing process for the printed circuit board, a step of peeling off the light-transmissible resin film is required before the exposed photosensitive resin layer can be developed. Since, conventionally the light-transmissible resin film has been peeled off manually and the thickness of the film is small, the operator must be highly skilled and careful in order to avoid damaging or destroying the photosensitive resin layer due to peeling stress concentration or the like. For that reason, it is time-consuming to peel off the light-transmissible resin film. Therefore, the total work time for the manufacturing process is long.

In order to solve the problem, automatic thin film peeling device has been proposed in commonly assigned Japanese Patent Application No. 23179/86. In the automatic thin film peeling device, the end of a light-transmissible resin film included in a stacked assembly stuck to an electroconductive layer on an electrically insulating base plate is pull-raised (simultaneously pulled and raised) or separated by a needle-like projection pusher, and a fluid is blown against the pull-raised part of the film to automatically peel off the film. The end of the stacked assembly must be pull-raised to a height in a narrow range of about several millimeters in order to avoid damaging the photosensitive resin layer in an area provided with a wiring pattern. For that purpose, the end of the stacked assembly is detected by an end sensor (contact sensor) of an electrostatic capacity type or electrical resistance type s as to bring the projection pusher into exact contact with the surface of the electroconductive layer at the end of the stacked assembly to pull-raise the end of the light-transmissible resin film. The end sensor has a rod-like electroconductive contact member whose tip is oriented in a direction at an obtuse angle to the direction of conveyance of the electrically insulating base plate. The contact member is brought into contact with the surface of the electroconductive layer on the electrically insulating base plate and the surface of the light-transmissible resin film.

The detection of the end of the stacked assembly by the end sensor will now be described. The electrically insulating base plate bearing the stacked assembly stuck to the electroconductive layer is conveyed toward a light-transmissible resin film peeling position. When the downstream end (in the direction of conveyeance of the electrically insulating base plate) of the stacked assembly has passed by the tip (which is separated from the conveyance passage for the base plate) of the electroconductive contact member of the end sensor by a prescribed length, the conveyance of the electrically insulating base plate is stopped. The tip of the electroconductive contact member is then brought into contact with the surface of the light-transmissible resin film of the stacked assembly. Subsequently, the electrically insulating base plate is moved back in the direction opposite to that of its conveyance. When the electroconductive contact member of the end sensor has reached the end of the stacked assembly, contact of the tip of the contact member with the surface of the light-transmissible resin film is replaced by that of the tip of the contact member with the surface of the electroconductive layer on the base plate. At that time, the electrostatic capacity of the end sensor (if it is of the electrostatic capacity type) or the electrical resistance of the end sensor (if it is of the electric resistance type) changes and the end of the stacked assembly is detected in terms of the change.

However, since the tip of the electroconductive contact member of the above-mentioned end sensor is oriented in a direction at an obtuse angle to the direction of the conveyance of the electrically insulating base plate, the base plate must be moved back in order to detect the end of the stacked assembly. For that reason, there is a problem in that the time which it takes for the end sensor to detect the end of the stacked assembly is long.

Moreover, the tip of the electroconductive contact member of the end sensor has a tendency to catch the conveyed electrically insulating base plate, particularly if the base plate is so thin as to sag during conveyance or is warped or deformed for some reason. Thus, there is another problem in that the electroconductive contact member is likely to be damaged or destroyed.

Since the time which it takes for the end sensor to detect the end of the stacked assembly is long, the number of light-transmissible resin films which can be peeled off per unit time is small. For that reason, there is still another problem in that the productivity of the automatic thin film peeling device having the end sensor is low.

SUMMARY OF THE INVENTION

The present invention was made in order to solve the above-mentioned problems.

Accordingly, it is an object of the present invention to reduce the time which it takes for an end sensor to detect the end of a thin film stuck to a base plate.

It is another object of the present invention to prevent the end sensor from being damaged or destroyed.

It is still another object of the present invention to improve the productivity of a thin film peeling device having an end sensor.

Typical aspects of the present invention are outlined below.

One aspect of the invention relates to the provision of an end sensor for detecting the end of a thin film stuck to the surface of a base plate which is conveyed in a prescribed direction, wherein an electroconductive contact member shaped as a rod or a plate is provided, and the tip of the contact member is oriented in a direction at an acute angle to the direction of the conveyance of the base plate so as to come into contact with the surface of the base plate and that of the thin film.

As the base plate is conveyed in the prescribed direction, the electroconductive contact member is moved relative to the base plate from the downstream end (in the direction of conveyance of the base plate) of the surface of the base plate while being in contact with the surface of the base plate. Thus, the position of the downstream end (in the direction of conveyance of the base plate) of the thin film is detected by the end sensor when the electroconductive contact member has reached the downstream end of the thin film. For that reason, it is not required to move the base plate back to detect the end of the thin film. Therefore, the time required for the end sensor to detect the end of the thin film is short.

Since the electroconductive contact member of the end sensor comes into contact with the conveyed base plate while the contact member lightly strokes the base plate, the contact member is prevented from catching on the base plate so as to be damaged or destroyed.

Since the time required for the end sensor to detect the end of the thin film is short, the productivity of the thin film peeling device having the end sensor is high.

DESCRIPTION OF THE PREFERRED EMBODIMENTS

Figure 1:
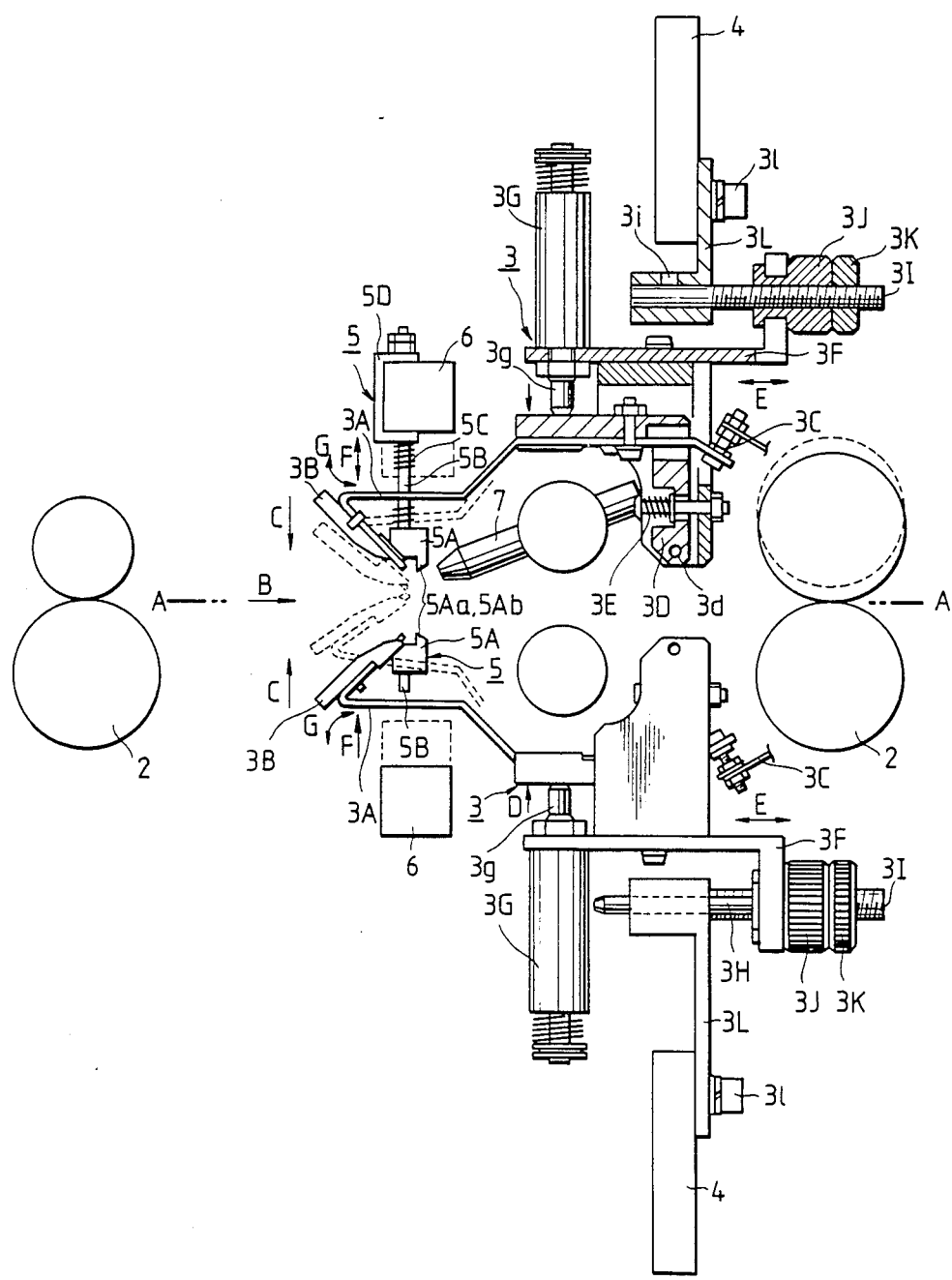
FIG. 1 shows a partially sectional view of a protective film peeling device having end sensors constructed in accordance with a preferred embodiment of the present invention.

Preferred embodiments of the present invention, in the form of an end sensor applied to a device for peeling a protective film off a base plate for a printed circuit board, is hereafter described with reference to the attached drawings. Mutually equivalent portions shown in the drawings are designated by like reference numerals.

Figure 2:
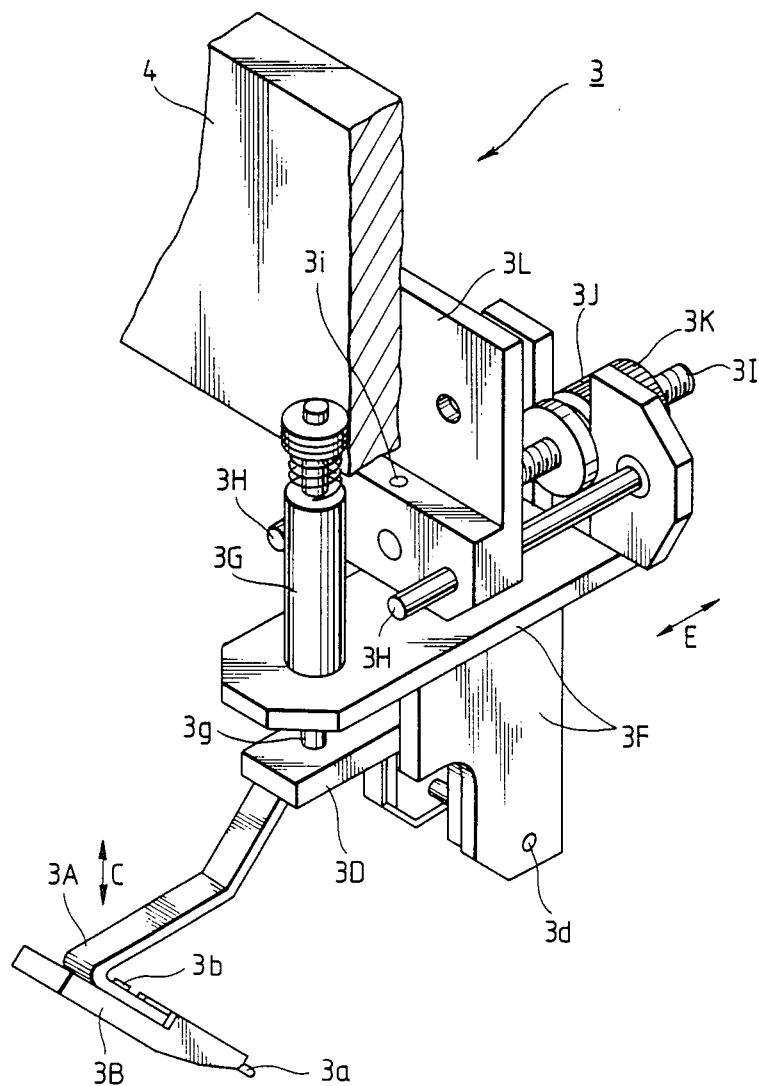
FIG. 2 is a perspective enlarged view of a major part of the end sensor.
Figure 3:
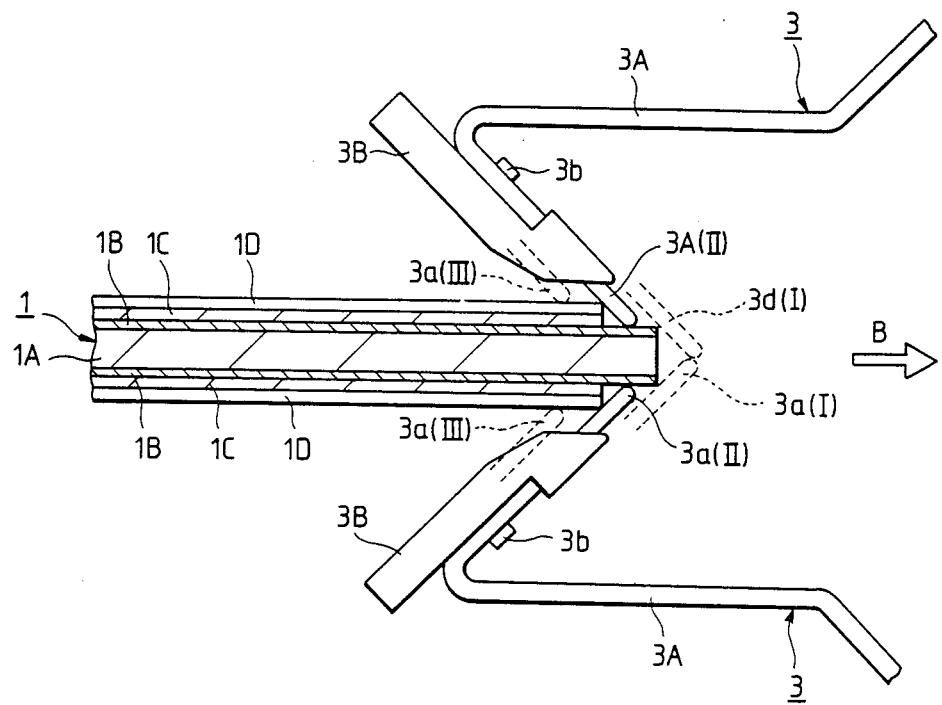
FIG. 3 shows a partially-sectional enlarged view of the major parts of the end sensors.

FIG. 1 shows a partially sectional view of the protective film peeling device. FIG. 2 shows a perspective enlarged view of a major part of the end sensor. FIG. 3 shows a partially sectional enlarged view of the major part.

As shown in FIGS. 1, 2 and 3, the printed circuit board 1 is conveyed toward a thin film pull-raising position by conveyance rollers 2. An end sensor 3 detects the downstream end (in the direction of conveyance of the printed circuit board) of the board. As shown in FIGS. 1 and 3, the printed circuit board 1 is conveyed in a conveyance passage A—A in the direction of an arrow B.

As shown in FIG. 3, the printed circuit board 1 includes the electrically insulating base plate 1A and an electroconductive layer 1B made of copper or the like and formed on at least one side of the base plate. A stacked assembly of a photosensitive resin layer 1C and a light-transmissible resin film 1D, which is the protective film, is laminated on the electroconductive layer 1B of the printed circuit board 1 by heat and pressure. Before the printed circuit board 1 is conveyed toward the thin film pull-raising position, the photosensitive resin layer 1C is exposed to light through a prescribed wiring pattern film overlaid thereon.

As shown in FIGS. 1 and 2, a pair of end sensors 3 are provided at upper and lower positions. Each of the end sensors includes as primary components an electroconductive contact member 3A, an electric insulator B, a connecting terminal 3C, a rotatable member 3D, an elastic member 3E, a horizontally moving member 3F, a vertical driver 3G, a horizontal guide member 3H, a screw member 3I for horizontal movement, a driving bolt 3J, a securing bolt 3K and a support member 3L.

The pair of electroconductive contact members 3A are provided over and under the conveyance passage A—A for the printed circuit board 1 so that the tip 3a of each electroconductive contact member can contact with the surface of the electroconductive layer 1B of the printed circuit board and the surface of the light-transmissible resin film 1D. The electroconductive contact member 3A is made of an electroconductive plate of angular or round cross section. The tip 3a of the electroconductive contact member 3A is oriented in a direction at an acute angle to the direction (shown by an arrow B in FIGS. 1 and 3) of conveyance of the printed circuit board 1. The acute angle is set at 30° to 60° to the surface of the printed circuit board 1. The electroconductive contact member 3A is bent in a "V" shape. The contact member 3A is made of a hard electroconductive material such as iron or stainless steel so that the member is not substantially deformed upon contact with the printed circuit board 1. The electroconductive contact member 3A is thus prevented from being elastically or plastically deformed due to contact with the printed circuit board 1 as would change the position of the tip 3a of the contact member to lower the accuracy of the detection of the end of the stacked assembly.

The portion of the electroconductive contact member 3A, which is especially likely to contact with some member other than the printed circuit board 1, is fitted with the electric insulator 3B away from the tip 3a of the contact member. The electric insulator 3B is made of resin or rubber and secured to the electroconductive contact member 3A by a screw 3b. The electric insulator 3B may otherwise be provided by coating the surface of the electroconductive contact member 3A with a resin film.

The connecting terminal 3C for connecting the electroconductive contact member 3A to a detector (not shown in the drawings) of the electrostatic capacity type is provided at the butt of the contact member. The connecting terminal 3C is formed by a bolt and a nut combined with each other.

The portion of the electroconductive contact member 3A near the connecting terminal 3C is secured to the rotatable member 3D by a bolt and a nut. The rotatable member 3D can be rotated in the direction of an arrow C about a rotary shaft 3d to move the tip 3a of the electroconductive contact member 3A toward or away from the conveyance passage A—A.

The elastic member 3E continuously pushes the rotatable member 3D on the horizontally moving member 3F to move the tip 3a of the contact member 3A away from the conveyance passage A—A. The elastic member 3E may be implemented with a helical spring, for example.

The vertical driver 3G, which may be a solenoid, is secured to the horizontally moving member 3F. The movable shaft 3g of the vertical driver 3G in action pushes the rotatable member 3D in the direction of an arrow D to move the tip 3a of the contact member 3A toward the conveyance passage A—A, in the direction of the arrow C, against the elastic force of the elastic member 3E. The vertical driver 3G may be implemented with a pneumatic cylinder, a hydraulic cylinder or the like instead of a solenoid.

The horizontally moving member 3F is moved in a horizontal direction (the direction of an arrow E parallel to the conveyance passage A—A) relative to the support member 3L by the screw member 3I and the dividing bolt 3J while being guided by the horizontal guide member 3H secured to the horizontally moving member. The screw member 3I for effecting horizontal movement is secured at one end to the support member 3L by a recessed screw 3i, and fitted at the other end thereof in the driving bolt 3J. The driving bolt 3J is rotated through the action of the guide groove of the horizontally moving member 3F to move the screw member 3I in the axial direction thereof (in the direction of the arrow E) to move the horizontally moving member 3F.

The securing bolt 3K secures the driving bolt 3J through a double-nut action so as to secure the horizontally moving member 3F.

The position of the tip 3a of the electroconductive contact member 3A is finely adjusted in the horizontal direction by the horizontal movement of the horizontally moving member 3F.

The support member 3L is secured by a bolt 3l to a support frame 4 secured to the cover (not shown in the drawings) of the protective film peeling device.

The end sensor 3, constructed as described above, detects the end of the stacked assembly of the printed circuit board 1 as now described.

The printed circuit board 1 on which the stacked assembly of the photosensitive resin layer 1C and the light-transmissible resin film 1D is laminated by heat and pressure is conveyed toward the thin film pull-raising position by the conveyance rollers 2. In front of the thin film pull-raising position, the position of the center of the width of the printed circuit board 1 and that of the center of the width of the conveyance passage A—A are made coincident with each other by a centering device (not shown in the drawings). Afterwards, a controller (not shown in the drawings) starts counting. After the controller has counted a prescribed number, the controller puts the vertical driver 3G of each end sensor 3 into action to move the movable shaft 3g in the direction of the arrow D before the printed circuit board 1 reaches the thin film pull-raising position. The upper and the lower rotatable members 3D are rotated by the action of the vertical drivers 3G so that the tips 3a of the electroconductive contact members 3A are moved toward the conveyance passage A—A (in the directions of the arrows C). At that time, the tips 3a of the upper and the lower electroconductive contact members 3A approach each other as shown by dotted lines 3a(I) in FIG. 3.

When the downstream end (in the direction of conveyance of the printed circuit board 1) of the board is conveyed to the thin film pull-raising position, the tips 3a of the electroconductive contact members 3A come into contact with the electroconductive layers 1B at the downstream end of the conveyed printed circuit board. When the printed circuit board 1 is conveyed further with the tips 3a of the contact members 3A contacting the electroconductive layers 1B, the tips 3a are pushed away from each other (slightly moved away from the conveyance passage A—A) due to the thickness of the printed circuit board so that the tips are moved to positions shown by dotted lines 3a(II) in FIG. 3 while the tips 3a of the contact members 3A leave contact with the electroconductive layers 1B at the downstream ends of the stacked assemblies and come into contact with the light-transmissible resin film 1D of the stacked assemblies as shown by dotted lines 3a(III) in FIG. 3, causing the electrostatic capacity (or resistance) between the end sensors 3 to change. The downstream ends of the stacked assemblies are detected in terms of the change in the electrostatic capacity.

As described above, each end sensor 3 has the electroconductive contact member 3A which is shaped as a plate but may be shaped as a rod and whose tip 3a is oriented at an acute angle to the direction (the direction of the arrow B) of conveyance of the printed circuit board 1 so as to contact the surface of the printed circuit board and that of the light-transmissible resin film 1D. As the printed circuit board 1 is conveyed in the direction of the arrow B, the tips 3a of the contact members 3A are moved relative to the printed circuit board from the downstream ends of the surfaces of the electroconductive layers 1B while remaining in contact therewith. When the tips 3a of the contact members 3A have reached the downstream ends of the stacked assemblies, the positions of the downstream ends of the stacked assemblies are detected by the end sensor 3. To achieve that purpose, it is not required to move the printed circuit board back in the direction reverse to that of its primary conveyance. Therefore, the time required for each end sensor 3 to detect the end of the stacked assembly is short.

Since the tip 3a of the electroconductive contact members 3A of each end sensor 3 is oriented at an acute angle to the direction of conveyance of the printed circuit board 1, the tip of the contact member comes into contact with the surface of the electroconductive layer 1B of the printed circuit board and the surface of the light-transmissible resin film 1D as the tip only lightly strokes the surfaces. For that reason, the electroconductive contact member 3A is prevented from catching on the printed circuit board 1 so as to be damaged or destroyed.

Since the time required for the end sensor 3 to detect the end of the stacked assembly is short, the number of light-transmissible resin films 1D which can be peeled off by the protective film peeling device per unit time is large. Therefore, the productivity of the inventive protective film peeling device is high.

After the position of the end of the stacked assembly is detected by the end sensor 3, the light-transmissible resin film 1D of the assembly is pull-raised from the photosensitive resin layer 1C at the detected end of the assembly by a thin film pull-raising unit 5 provided near at least one side of the conveyance passage A—A of the printed circuit board 1, as shown in FIG. 1. The thin film pull-raising unit 5 includes primarily a pull-raising member 5A, a sliding shaft 5B, an elastic member 5C and an attaching member 5D. The pull-raising member 5A has two pull-raising blades 5Aa and 5Ab disposed at a prescribed interval in a direction perpendicular to the direction of conveyance of the printed circuit board 1 and which are integrally coupled to each other. The edges of the pull-raising blades 5Aa and 5Ab extend substantially parallel to the end of the stacked assembly at the downstream end of the printed circuit board 1. The pull-raising blades 5Aa and 5Ab are made of a metal such as stainless steel or carbon steel, or a nonmetallic material such as a ceramic. The thin film pull-raising unit 5 is supported by a support member 6 in such a manner that the unit is movable toward and away from the conveyance passage A—A, in the directions of arrows F, by a link mechanism (not shown in the drawings) and turned in the directions of arrows G by a rotating link mechanism (not shown in the drawings) to pull-raise the end of the light-transmissible resin film 1D of the stacked assembly from the photosensitive resin layer 1C.

After the end of the light-transmissible resin film 1D of the stacked assembly is pull-raised from the photosensitive resin layer 1C by the thin film pull-raising unit 5, a pressurized fluid such as air is blown from a fluid ejection nozzle 7 to the pull-raised part of the film so that the film is completely peeled off the layer in a simple, instantaneous and positive manner.

The electroconductive contact member 3A of each end sensor 3 may be made of an elastic electroconductive material such as copper so as to be slightly and elastically deformed when coming into contact with the printed circuit board 1 to exactly guide the downstream end of the board in the conveyance passage A—A.

Each end sensor 3 may be made of the electrical resistance type to detect the end of the stacked assembly in terms of a change in electric resistance between the end sensor 3.

The electroconductive contact member 3A of each end sensor 3 need not be bent in a "V" shape, but may be shaped as a substantially straight plate or rod to have the tip 3a oriented in a direction at an acute angle to the direction of conveyance of the printed circuit board 1 and attached to the cover of the protective film peeling device in front of the thin film pull-raising unit 5 in the direction of conveyance of the printed circuit board.

The present invention is not confined to the above-described embodiment, and may be embodied or applied in other various ways without departing the spirit and essential character of the invention. For instance, the downstream and upstream ends (in the direction of conveyance of a printed circuit board) of a stacked assembly laminated on the board by heat and pressure may be detected by the end sensor to detect the area of the printed circuit board on which the stacked assembly is laminated. In other words, the end sensor may be used as a lamination sensor for an automatic thin film laminator which functions so that the stacked assembly composed of a photosensitive resin layer and a light-transmissible resin film is automatically laminated on the electroconductive layer of an electrically insulating base plate.

If the end sensor 3 is of the electrostatic capacity type, the boundary between an electrically insulating region and an electroconductive region can be detected in terms of a change in electrostatic capacity. When the end sensor 3 is of the electrical resistance type, the boundary between two or more regions differing from one another in electric resistance can be detected.

The end sensor 3 can be used not only to detect the end of the stacked assembly of the printed circuit board but also to detect the end of each of a synthetic resin film, paper or the like stuck to a metal plate for uses other than printed circuit boards.

According to the present invention, an end sensor for detecting the end of a thin film stuck to the surface of a base plate conveyed in a prescribed direction is provided with an electroconductive contact member shaped as a rod or a plate and whose tip is oriented in a direction at an acute angle to the direction of conveyance of the base plate so as to contact with the surface of the base plate and that of the thin film. As the base plate is conveyed in the prescribed direction, the electroconductive contact member is moved relative to the base plate from the downstream end (in the direction of conveyance of the base plate) of the surface of the base plate while remaining in contact with the surface of the base plate so that the position of the downstream end (in the direction of the conveyance of the base plate) of the thin film is detected by the end sensor when the contact member reaches the downstream end of the thin film. Thus, it is not necessary to move the base plate back in the direction opposite to that of the normal conveyance direction to detect the position of the end of the thin film, Therefore, the time required for the end sensor to detect the end of the thin film is short.

What is claimed:

1. An end sensor for detecting an end of a thin film stuck to a surface of a base plate conveyed in a prescribed direction, comprising: a plurality of electroconductive contact members, a tip of said contact member being oriented in a direction at an acute angle to a direction of conveyance of said base plate so as to contact a surface of said base plate and a surface of said thin film; and means for mounting said contact members adjacent a conveyance path of said base plate such that an electrical parameter of said contact members changes when the base plate is conveyed between them.

2. The end sensor according to the claim 1, wherein said electroconductive contact member are bent in a "V" shape so that only said tips are oriented in said direction at an acute angle to said direction of conveyance of said base plate.

3. The end sensor according to claim 1, wherein said electroconductive contact members are coated with an electric insulator except for a portion of said tips of said contact members.

4. The end sensor according to claim 1, wherein said sensor is of an electrostatic capacity type.

5. The end sensor according to claim 1, wherein said sensor is of an electrical resistance type.

6. The end sensor according to claim 1, wherein said electroconductive contact members are made of a hard electroconductive material so that said contact members are substantially not deformed due to contact thereof with the conveyed base plate.

7. The end sensor according to claim 1, wherein said electroconductive contact members are made of an elastic electroconductive material so that said contact members are slightly deformed due to contact thereof with the conveyed base plate.

8. The end sensor according to claim 1, wherein said sensor is disposed to detect a pull-raised position of an end of a thin film in a thin film peeling device in which said thin film stuck to said base plate is automatically peeled off said base plate.

9. The end sensor according to the claim 8, wherein said thin film peeling device comprises means for blowing a fluid to pull raised end of said thin film to peel said film off said base plate.

10. The end sensor according to claim 1, wherein said electroconductive contact members are rod shaped.

11. The end sensor according to claim 1, wherein said electroconductive contact members are plate shaped.

* * * * *